April 1, 1969     P. LAMORLETTE     3,436,540
PHOTO-ELECTRICAL VEHICLE DETECTING DEVICE FOR TRAFFIC SURVEY
Filed April 7, 1967
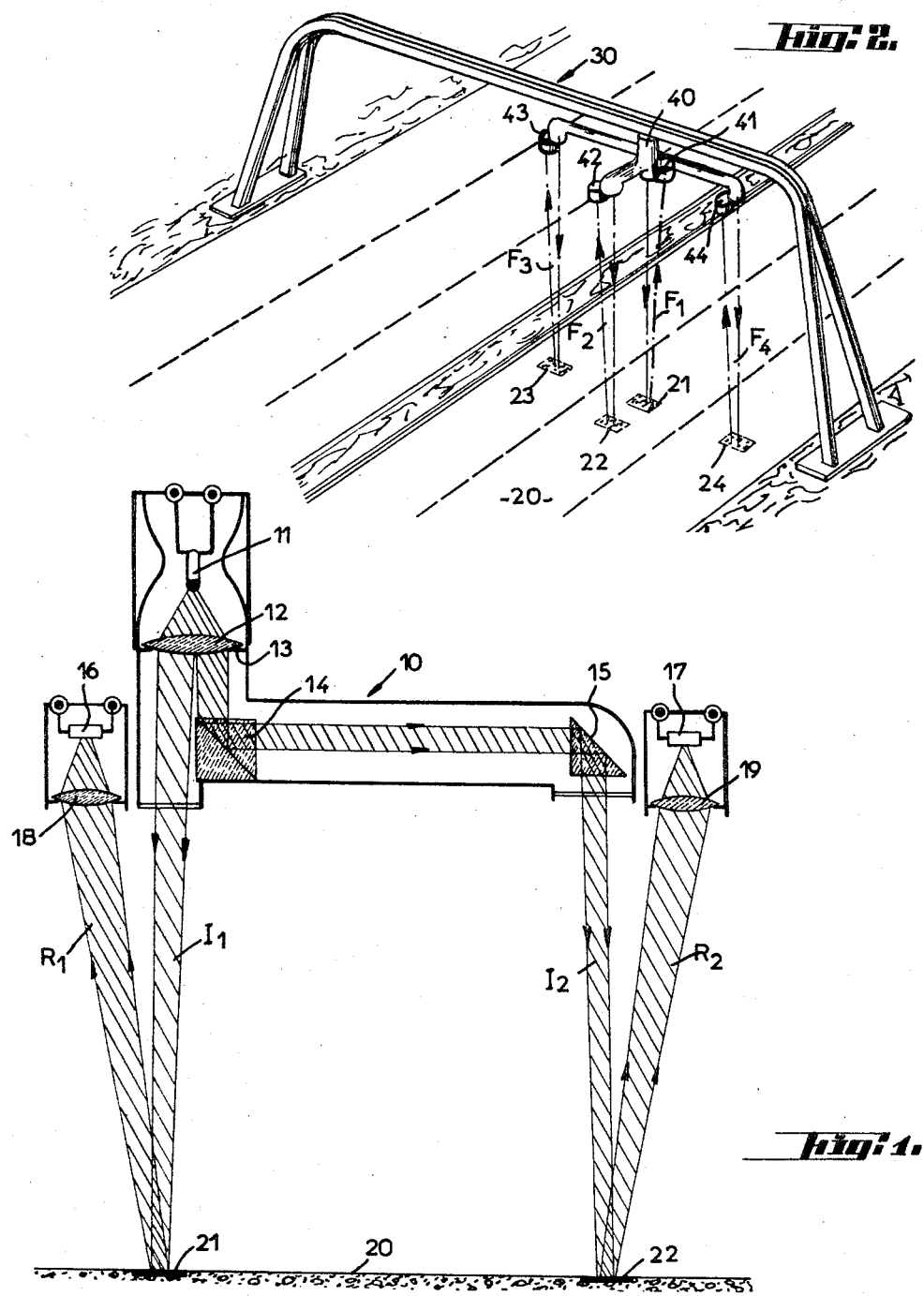
INVENTOR
PAUL LAMORLETTE
BY
 *Nolte & Nolte*
ATTORNEYS

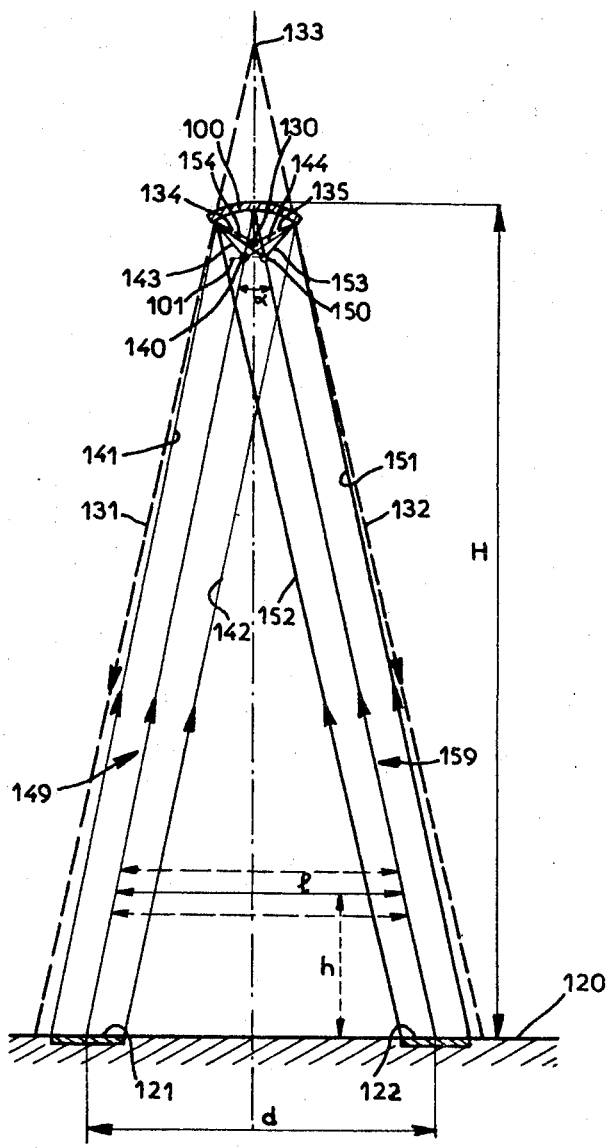

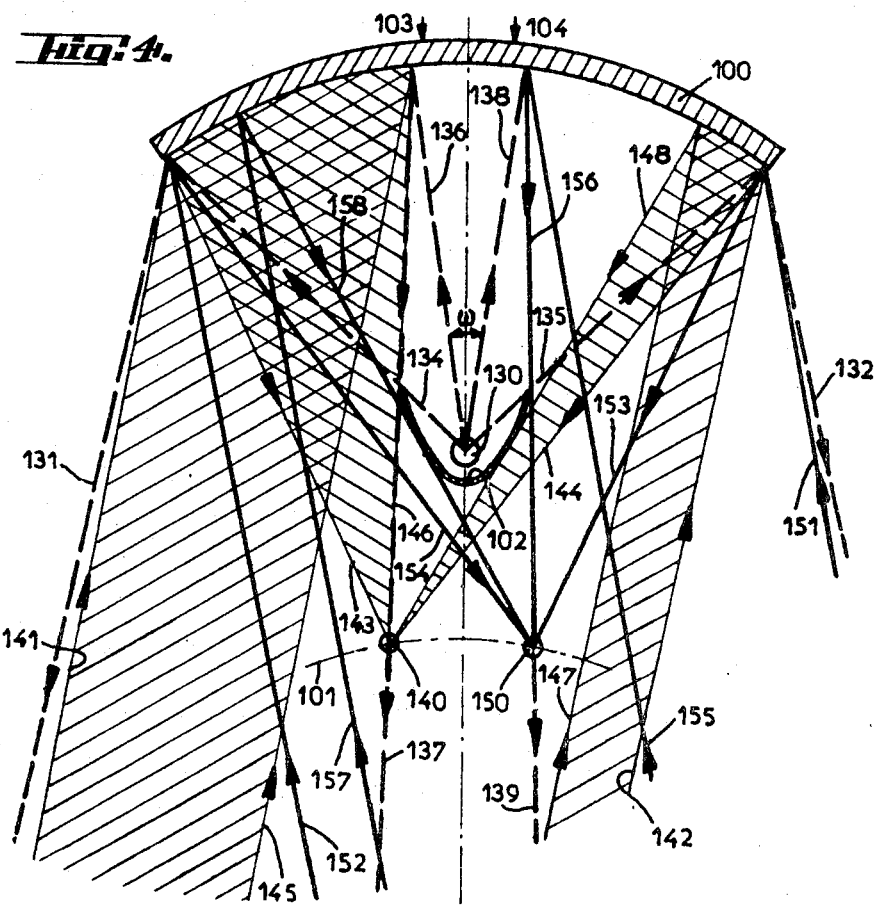

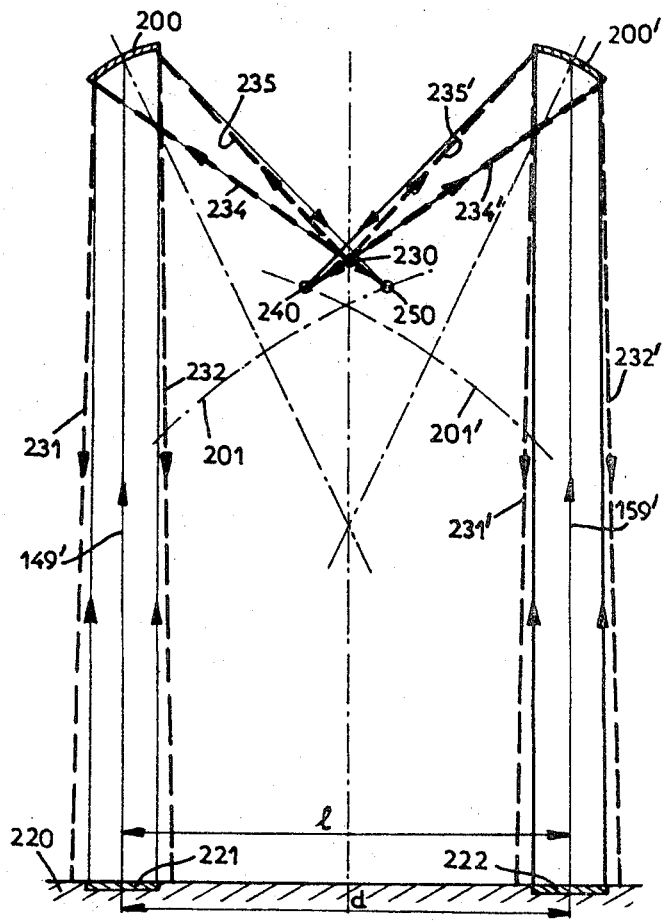

United States Patent Office 3,436,540
Patented Apr. 1, 1969

3,436,540
PHOTO-ELECTRICAL VEHICLE DETECTING
DEVICE FOR TRAFFIC SURVEY
Paul Lamorlette, Paris, France, assignor to L'Eclairage
des Vehicules sur Rail, Paris, France, a company of
France
Filed Apr. 7, 1967, Ser. No. 629,252
Claims priority, application France, Apr. 8, 1966,
57,099
Int. Cl. G01t 1/16
U.S. Cl. 250—83.3                                    8 Claims

ABSTRACT OF THE DISCLOSURE

This invention relates to a device for vehicle detection, which comprises one emitting unit radiating electromagnetic and notably infrared radiation, such as a gallium arsenide type diode, reflective and/or refractive optical means for directing said radiation onto the roadway in at least one beam concerning each involved traffic lane, and for each of said beams, at least one receiving unit, and notably a solid state photosensitive device, able selectively to identify the radiation reflected by said roadway and/or the radiation reflected by a vehicle.

---

The present invention relates in a general way to devices designed to detect the passing and/or the presence of a vehicle at a point of a traffic track, with the purpose of allowing either a simple counting of the vehicles, or a more intricate analysis of the traffic, including for example measurements of the speed of the vehicles, or, through an integration of the data supplied by several detectors, the automatic control of the traffic regulation means, such as traffic lights protecting cross-roads, survey-poles securing a proper distance between the vehicles, or an automatic toll-device.

The vehicle detectors of known types comprise usually a detecting unit with a mechanical, pneumatic, electrical or electromagnetic operation implanted on the roadway, or again aerial detecting units with an optical, photo-electrical or radio-electrical operation. In the first case, the operators consider that the presence of the detecting device on the roadway as well as the works necessary for its implantation involve outstanding inconveniences; on the other hand, the aerial devices entail often the drawback of being hardly suitable for the communicaiton of precise data, such as, for instance, the density of the traffic, the length of the vehicles, etc., liable to the directly integrated by automatic devices or by computers.

The present invention aims at the embodiment of devices for the detection of vehicles, these devices being free of the aforementioned inconveniences, as they do not require important works for their implantation, and as they are perfectly suitable to feed automatic devices or other appliances used for the integration of the data.

A device for the detection of vehicles in accordance with the invention is remarkable notably in that it comprises an electromagnetic radiating unit, and especially an infrared radiator, preferably modulated, for example in the guise of pulses of optical means, in order to direct said radiation upon the roadway in one or several beams affecting each of the concerned traffic tracks and liable to be selectively intercepted by any vehicle making use of said track, and, for each of said beams, at least one receiving unit able to identify the radiation reflected by the roadway in absence of vehicles and/or the radiation reflected by said vehicle.

It appears at once that the device according to the invention is little expensive and easy to implant, as well as it does not constitute any constraint to the traffic. Besides, the modulation, especially in the guise of pulses, of the radiation presents the advantage of increasing considerably the sensitiveness of the device without increasing by that the required supply power, and consequently without involving an overheating of the components, while the operation of the device is freed from the disturbing interference of any possible statics.

According to other features of the invention, the aforementioned emitting unit comprises a photo-emissive diode, preferably of a gallium arsenide type, by a laser or an equivalent and the aforementioned receiving unit includes a photo-sensitive semi-conductor device, such as a photoconductive cell, a photodiode, a phototransistor or the like.

The choice of such a radiation source offers the advantage of permitting the production of an intense flux with a low power supply, the produced radiation being easily focused and collimated, and, in addition, it can be readily modulated or coded at the emission, especially in order to avoid any interaction between this radiation and radiations of interference signals and/or beams designed for different receiving units. Besides, the choice of such receiving units grants a high sensitiveness and a short reflection time to the device, in accordance with the modulation of the emitted radiation, and permitting, if necessary, the aforementioned measurement of the speed of the vehicles.

According to still further features of the invention, the aforementioned roadway is provided or equipped with reflecting means made up by catadioptric devices, reflecting plates or the like added to its surface or by particles of a reflecting material incorporated to its coating, or inversely, the device is provided with means selectively absorbing the aforementioned radiation.

According to other characteristics of the invention, the aforementioned optic means comprise prisms, lenses and other refractive elements and/or reflectors, preferably metallic.

Other features and advantages of the invention will become more apparent during the course of the description which follows and on the appended drawings, wherein:

FIGURE 1 is a schematic illustration of a first example of embodiment of the device for the detection of vehicles in accordance with the invention;

FIGURE 2 shows the control of a traffic using three tracks of a roadway by means of a detecting device of the type represented on FIGURE 1;

FIGURE 3 is a schematic illustration showing the operating way of another example of embodiment of the device for the detection of vehicles according to the invention;

FIGURE 4 shows, at a larger scale, the top part of FIGURE 3, and

FIGURE 5 is a schematic illustration showing the operating way of a third method of embodiment of the device which is object of the invention.

On FIGURE 1 has been represented, in a schematic cross-section, a device for the detection of vehicles, indicated by 10 as a whole, designed to be implanted above the roadway 20 of a road or the like, for example on an arched support provided for this purpose, or again on an overpass, on the vault of a tunnel, on a light post or on any other appropriate support. The device 10 includes an infrared radiator unit, comprising essentially a gallium arsenide diode 11 and a focusing and collimating device, for instance made up by a lens 12 of a proper material and by a diaphragm 13; the infrared radiation issued by the emitting unit is directed onto the roadway 20, but only part of it directly, the remnant being led through reflecting prisms 14, 15 or through any other appropriate guiding means, in such way as to form two incident beams $I_1$ and $I_2$, at a distance from each other and preferably substantially parallel and vertical.

At the respective points of incidence of beams $I_1$ and $I_2$, the roadway 20 is provided with reflecting means 21, 22 which may for example be constituted by catadioptric devices, reflecting plates or any other reflectors added to the surface of the roadway, or again by particles of an appropriate reflecting material incorporated to the coating of said roadway. At least a part of the infrared radiation striking the roadway 20 is thus normally reflected in the shape of a reflected beam $R_1$, $R_2$ towards its respective receiving unit arrayed in the vicinity of the outlet gate of the corresponding incident beam. Each receiving unit comprises for example a phototransistor 16, 17 and a lens 18, 19 focusing the reflected radiation upon the photosensitive junction of said transistor.

The described detecting device is of course housed in a protecting and supporting casing diagrammatically represented on FIGURE 1, and it is besides completed by an (not represented) electronical supply and detecting appliance, the main features of which will appear during the course of following description relating to the operation and the use of said detecting device.

The principle of operation of the device results obviously from its structure: in the absence of any vehicle, the infrared radiation reflected by reflectors 21, 22 polarizes through conduction the phototransistors 16, 17; when a vehicle passes under the detecting device, at least one of the incident beams $I_1$, $I_2$ and of the reflected beams $R_1$, $R_2$ is intercepted, in such a way that the corresponding transistor is momentaneously turned off. This change in the state of the transistor is of course utilized by the aforementioned electronical appliance according to the special functions of the device.

The detecting device operating according to the simple way which has just been briefly described, would already offer a good reliability of service.

Indeed, the gallium arsenide diode 11 radiates, even with a very low supply power, an intense infrared flux—the radiated power may reach a fraction of a watt—and this flux may besides be easily focused and collimated; this infrared radiation presents, on the one hand, well-defined physical features, so that the chance of a confusion with radiations of interference signals is low, and, on the other hand, it offers a high penetrating power, in such a way that it may, without an excessive loss, cover fairly long distances, whatever the atmospheric conditions and the smudge upon the reflecting means 21, 22 might be. From these different points of view, the device according to the invention avers to be much more secure than the standard photoelectric detectors.

This service reliability may, if necessary, be readily increased in an important proportion by using the device in pulsing operation: indeed, the gallium arsenide diode presents an extremely low constant of the emitting time, so that it is possible to supply it with current impulses presenting a very high intensity (for example several tens of amperes) each impulse lasting a few microseconds and for instance repeated about 100 times per second. Thus, the range, the sensitiveness and the selectivity of the device—and hence its reliability of service—are increased function of the applied instantaneous power; nevertheless, the medium power, and hence the heating of the diode, remain very low while the pulse repetition frequency secures a good continuity in the detection. In this case, the aforementioned electronical appliance comprises advantageously means securing the integration of the signals received by each of the receiving units, and/or clamping means securing the locking of said receiving units between the pulses.

Such clamping means could for example include, associated to each of the receiving units, a photodiode or the like provided in such way as to receive directly a fraction of the corresponding incident beam.

The operating reliability of the device may again be increased by adding to each receiving unit a second receiving unit coupled in opposition and arranged in such way as to receive only the radiation of interference signals and especially the radiation reflected by a vehicle intercepting the incident beam: by comparing the data supplied by the association of the two detecting units, it is possible to become free of all disturbing influence.

Finally, and according to an essential feature of the invention, the low inertia of the photo-emissive diode may again be utilized to modulate or to code the infrared radiation emitted continuously or by pulses, in order to avoid any disturbance by radiation of interference signals or between beams designed for neighboring receiving units.

Besides its advantages from the service reliability point of view, the device according to the invention presents great facilities for its implantation, allowing a cheap installation for various uses, as, for example, one and the same diode may supply simultaneously several receiving units, as shown in the method of embodiment illustrated by FIGURE 1: both receiving units integrated to this device could be applied to two distinct traffic tracks, and in this case the device 10 could be installed across the roadway and would allow ready counting of the vehicles passing on each of said tracks; or else, these two receiving units could as well be applied to one and same traffic track, and in this case the device 10 should be installed parallel to the axis of said track and would allow, besides the counting of the vehicles, the measurement of their speed and/or the appreciation of their length.

Of course, the device is by no ways limited to the described combination, and could comprise only one receiving unit, or again several receiving units, all arranged according the special intended use of the device.

Thus, on FIGURE 2, has been represented a device of the same type than that shown on FIGURE 1, and performing the traffic control of a street, the roadway 20 of which is divided in three traffic tracks. The device, mounted on an arched support 30 installed across the street, comprises a single emitting unit 40 which supplies, through proper optical guiding means, four beams $F_1$, $F_2$, $F_3$ and $F_4$ of infrared rays, the two first beams being applied to the central track of the roadway, and the two other applied respectively to the internal and the external tracks of said roadway. At the vicinity of the point of incidence met by each of said beams the roadway 20 is provided with reflecting means, respectively indicated by 21, 22, 23 and 24. These reflecting means return the infrared beams $F_1$, $F_2$, $F_3$ and $F_4$ respectively toward the four receiving units. Thus, the device may perform, in addition to the counting of the vehicles passing on each track, the measurement of the speed of the vehicles passing on the central track; from this measurement, the number of vehicles passing on one kilometer of street may be deduced (i.e., the ratio of the number of vehicles passing within an hour under arched support to the medium speed of said vehicles) this datum being especially important to appreciate the dynamic phenomenons appearing in a line of moving vehicles.

Two other examples of embodiment of the device according to the invention will now be described. They are diagrammatically illustrated by FIGURES 3, 4 and 5, wherein the optical means controlling the radiation comprise reflecting elements instead of the lenses and prisms incorporated in the previously described method of embodiment. As a matter of fact, tests have shown that a reflector, especially a metallic reflector in the case of the radiation employed, secures usually the better operation than a lense or a similar refractive device. Besides, as it will appear in the following description, using reflecting elements permits to simplify notably the structure of the device according to the invention, and hence reduce its cost.

Following the method of embodiment of the device according to the invention shown in a schematic way on FIGURES 3 and 4, a reflector 100 is arranged at a height H above the track 120 of a roadway, this reflector being advantageously constituted by a parabolic metallic mirror the focal plane of which is indicated by 101. An emitting unit 130, such as for example a photo-emissive diode, is arranged at the vicinity of the focal plane 101, between said plane and the mirror 100. The radiation beam emitted toward the mirror 100 is reflected toward the roadway and, depending on the position of the emitter 130 with regard to the focal plane of the mirror, an incident beam is thus obtained, limited by the rays 131, 132 (in the plane of the figure), the vertex 133 of the cone being determined by principles usual in optics. The rays issuing from the emitter 130 and corresponding to the bordering rays 131, 132 are indicated by 134 and 135.

Two reflecting ranges or plates 121, 122 are for example provided in the coating of the roadway, these ranges being at a distance $d$ from each other, this distance being measured parallel to the axis of the involved track. Each of these reflecting plates returns towards the mirror 100, a reflected radiation beam, which, depending on the value given to the height H with regard to the size of the mirror, may be considered as a beam composed by parallel rays. The two parallel beams will hence concentrate in the focal plane at two distinct points, where the corresponding receivers 140 and 150 are arranged; thus, to receiver 140 corresponds the radiation beam 141–143, 142–144, and to receiver 150 corresponds likewise the radiation beam 151–153, 152–154.

At first approach, the device operates in the following manner. The emitter 30 sends upon the ranges 121 and 122 a well-defined radiation, preferably modulated; in the absence of vehicles, the ranges 121 and 122 reflected, onto the respective receivers, a certain portion of the received radiation.

When a vehicle passes on the track equipped with the ranges 121 and 122, it blacks-out said ranges during its passage, i.e. successively the range 121, then, an instant later, the range 122, creating thus two successive disturbing pulses in the reflected radiation beams which are received by the receivers 140 and 150.

Now, if each receiver has previously been associated to an amplifier detecting, for example by means of a capacitive circuit, the variation in the received radiation, and if in addition these two amplifiers are connected in a differential arrangement, it is easily perceived that only the two pulses caused by the passage of the vehicle which blacks out each signal on said ranges 121 and 122 will be detected.

The space of time separating these two pulses measures hence directly the time needed by the vehicle to cover the distance $d$. The speed of the vehicle may consequently be immediately deduced.

It should be noted that with such a differential arrangement, all interference signals which might be detected by the receivers 140 and 150 are eliminated in their effect. These interference signals may for example be originated by the street lights (modulated at the power line frequency). The receivers 140 and 150 receive necessarily this interference, but, due to the differential arrangement used, the interferences are canceled and therefore the device is not sensitive to the interference of the radiation to which it is subjected.

Advantageously, and as shown on FIGURE 4 a deflector or reflector 102 is provided behind the emitter 130, this reflector intercepting the radiation of the emitter 130 which is directed outward from the reflector 100, directing the radiation power issued by the emitter 130 in a useful direction and preventing radiation from coming directly from the emitter 130 from striking the receivers 140 and 150 so as not to saturate them.

In order to allow an easier reading of FIGURE 4 of the drawings, some rays issued by the emitter 130 and reflected by mirror 100 have been represented with fat dotted lines, while the rays coming from the range 121 (not represented) and directed towards the receiver 140, after a reflection on mirror 100 are figured by continuous small lines, and finally, the rays issued by range 122 (not represented) and directed toward the receiver 150 after reflection on mirror 100, are indicated by continuous fat lines on FIGURE 4.

Thus, on FIGURE 4, the different rays represented on FIGURE 3 will be found again. Besides, the bordering rays, such as 136 to 139, 145 to 148, 155 to 158, which are tangent to the deflector 102 (in the section plane of the figure) are also shown. In addition, the beams limited by rays 141, 145 and 142, 147, coming from the range 121, will, after reflection by mirror 100, following respectively rays 143, 146 and 144, 148, effectively strike the receiver 140; of course, a symmetrical arrangement is used for receiver 150, which receives two beams limited, on the one hand, by rays 151, 155, reflected following rays 153, 156 and, on the other hand, by the rays 152, 157, reflected following rays 154, 158.

It should be observed that rays 136 and 138, forming an angle $\omega$ between them determine a range on the mirror 100, limited by arrows 103 and 104, which is not effectively used for the reflection of the beams coming from ranges 121 and 122 and directed, after reflection, toward the receivers 140 and 150. Nevertheless, this dead angle represents but a very small surface portion of the mirror 100, and is utilized besides for a ready fixing of the latter.

By going back to FIGURE 3, it may be noted that an angle $\alpha$ divides necessarily the beams 149 and 159 coming from the ranges 121 and 122 and directed toward the mirror 100. It should also be remembered that in the first explanation given hereabove, it has been indicated how the speed of a vehicle may be determined by using the distance $d$ separating the two ranges 121 and 122.

Now, to be more precise, it is to be considered that the blacking-out of the beams 149 and 159 does not happen exactly at the level of the ranges, but at a certain height $h$ above the roadway, for example on level with the forward bumper of the vehicle. By calling H the height between mirror 100 and the roadway 120 above which the mirror is arranged, it appears at once as evident that the length $l$ which must be covered by the vehicle in order to black-out successively the two beams 149 and 159, is not equal to $d$, but is only part of this distance $d$:

$$l = d\left(1 - \frac{h}{H}\right)$$

At first approach, it may be admitted that the bumpers of all vehicles are substantially at the same height, which is of about 50 cm., with a maximum variation of about 10 cm. Of course, the height H must be sufficient to give passage to vehicles of any dimensions. By taking for example H equal to 3 meters, this corresponding to small-sized light-posts, it is readily seen that the error in appreciation of length $l$, function of the variation in the height of the bumpers, is equal to:

$$\frac{\delta l}{l} = \frac{\delta h}{H - h}$$

or, if $H = 3$ m., $h = 50$ cm. and $\delta h = 10$ cm.:

$$\frac{\delta l}{l} = \frac{4}{100}$$

Hence, by supporting a priori, that all bumpers on the vehicles are at a distance of 50 cm. above the roadway level, the maximum error in appreciation is of about 4% on the speed of the vehicle. Quite obviously, this error decreases as the height H increases.

If an extremely precise measurement of the speed of the vehicle is required, without taking in account the height of the bumpers, it is sufficient to annul the angle $\alpha$, this being for example obtained by means of the device diagrammatically illustrated on FIGURE 5.

In this figure, the various components of the device which are similar to those of the device on FIGURES 3 and 4, are indicated by the same marks but increased by hundred units. Thus, in 230 an emitter has been arranged between two reflecting parabolic mirrors 200, 200', with their respective focal planes 201, 201'. The axes of the mirrors 200 and 200' are shifted away from the vertical plane by an angle of about 30°. With the help of this arrangement, two substantially parallel beams, limited by the rays 231, 232 and 231', 232' are entitled toward a roadway 220, and more precisely directed toward the ranges, for example reflecting (or on the contrary, absorbing) 221, 222. These ranges reflect (or absorb) normally the beams 149' and 159' which, after reflection upon mirrors 200 and 200', focus respectively on receivers 250 and 240.

Quite obviously, under these conditions, the distance $l$ between the two vertical light beams 149' and 159' is equal to the distance $d$ between the ranges 221 and 222, whatever the height $h$, at which the beams 149' and 159' are blacked-out (or reflected), might be.

It is obvious too, that, as for the arrangement illustrated by FIGURE 3, a deflector or reflector may advantageously be arrayed on level with the emitter 230, in order to avoid saturation of receivers 240 and 250 by the rays issuing from the emitter. It is also advantageous to add to the emitter 230 a device allowing to channel the outlet power in two beams of incident rays arriving on mirrors 200 and 200' (limited by rays 234, 235 and 234', 235').

Of course, the device for the detection of vehicles according to the invention may be the object of many other alternative embodiments. More particularly, in an intricate system of traffic control, comprising detectors or sets of such detectors installed at a relatively great distance from each other, the duplication of certain equipment could be avoided by performing an interconnection of these detectors by means of beams of infrared rays having the same quality as that used for the detection. Thus, and for example, the control of the impulse system and/or of the modulation or coding could be the same, and the data provided by the detectors could be forwarded to a central traffic control device. In this same case, the power supply of the detectors and/or the forwarding of the data could also be advantageously secured according to the method provided by the French patent application No. 1,479,429 filed by the applicant on March 21, 1966 and having as title: "Improvements on devices for the control of automobile-traffic."

Besides, it may be taken as granted that the sort of the means applied to the device of the invention may be subjected to many modifications. Thus, the wave-length of the employed radiation, and consequently the type of the emittive unit are not critical; the latter especially could be made up by a laser or the like, producing an infrared radiation, or more generally an electromagnetic radiation, easy to modulate at the emission and readily directed. The focusing and the guiding means of the beams could advantageously comprise a combination of reflective and refractive units similar to those employed separately in the various examples of embodiment described hereabove; they could besides comprise filtering means, such as interference filters designed to increase the selectivity of the device, and hence its un-sensitiveness to radiations of interference signals.

Moreover, it may also be taken as granted that the device could be designed to respond no more to the blacking out created by the passage of a vehicle in a beam normally reflected by the roadway, but, on the contrary, to the reflection by said vehicle of a beam normally absorbed by the roadway, the essence of the radiation or that of the coating of the roadway being accordingly provided.

Finally, it is obvious that the traffic control devices or the like utilizing the devices for the detection of vehicles according to the invention remain in the scope of the present patent.

What I claim is:

1. A vehicle detecting device, notably for surveying traffic on a roadway, comprising a photo-emissive source emitting intense infrared radiation, such as a gallium arsenide diode; optical means associated to said source for focusing said radiation and splitting same into at least two beams directed downwards along respective, substantially vertical paths of incidence onto horizontally spaced portions of said roadway; said optical means operating for collecting the radiation reflected back along return paths each substantially coextensive with each of said paths of incidence; said optical means selectively directing the radiation reflected along each of said return paths onto a respective photoelectrical detector, such as a photosensitive solid state element; and electrical circuitry operatively associated to said source and detectors; wherein said optical means comprise at least one reflector having a focal plane; said source being located between said reflector and its focal plane and being partly surrounded by a deflector; and said detectors being located in said focal plane of said reflector in the shade of said deflector with respect to said source and reflector, at such spaced locations that the radiation reflected along each of said return paths is selectively focused by said reflector onto a respective detector.

2. A vehicle detecting device according to claim 1, wherein said deflector comprises a reflecting surface operative for directing the radiation emitted by said source onto said reflector.

3. A vehicle detecting device according to claim 1, wherein said deflector is shaped to split the radiation emitted by said source and reflected by said reflector into said beams.

4. A vehicle detecting device according to claim 1, wherein said means comprise at least two horizontally spaced reflectors having respective focal planes; said source being located between each of said reflectors and its focal plane, and being partly surrounded by a deflector; and each of said detectors being located in the focal plane of one of said reflectors, in the shade of said deflector with respect to said source and reflector, at such a location that the radiation reflected along the relevant return path is focused onto said detector.

5. A device according to claim 1, wherein said deflector comprises at least one reflecting surface operative for directing the radiation emitted by said source onto said reflectors.

6. A vehicle detecting device, notably for surveying traffic on a roadway, comprising a photo-emissive source emitting intense infrared radiation, such as a gallium arsenide diode; optical means associated to said source for focusing said radiation and splitting same into at least two beams directed downwards along respective, substantially vertical paths of incidence onto horizontally spaced portions of said roadway; said optical means operating for collecting the radiation reflected back along return paths each substantially coextensive with each of said paths of incidence; said optical means selectively directing the radiation reflected along each of said return paths onto a respective solid state element; and electrical circuitry operatively associated to said source and detectors providing for modulated emission of said source and synchronous operation of said detectors; wherein said optical means comprise at least one reflector having a focal plane; said source being located between said reflector and its focal plane and being partly surrounded by a deflector; and said detectors being located in said focal plane of said reflector in the shade of said deflector with respect to said source and reflector, at such spaced locations that the radiation reflected along each of said return paths is selectively focused by said reflector onto a respective detector.

7. A vehicle detecting device according to claim 6, wherein said electrical circuitry provides for pulse modulated emission of said source and for locking of said detectors between the pulses of radiation emitted by said source.

8. A vehicle detecting device according to claim 6, comprising a reference detector coupled to said electrical circuitry in opposition to each aforesaid detector and receiving directly a fraction of the radiation emitted by said source.

References Cited

UNITED STATES PATENTS 2,237,193   4/1941   Mobsby _____ 340—38
3,248,690   4/1966   Bolton.

FOREIGN PATENTS 715,444   9/1954   Great Britain.

RALPH G. NILSON, *Primary Examiner.*

MORTON J. FROME, *Assistant Examiner.*

U.S. Cl. X.R.

250—106, 222, 223, 216; 328—134; 340—38